United States Patent
Oliferenko

(10) Patent No.: US 9,950,966 B2
(45) Date of Patent: Apr. 24, 2018

(54) MANUFACTURING OF NITROGEN-CONTAINING MATERIALS

(71) Applicant: Gestalt Chemical Products, Inc., Alachua, FL (US)

(72) Inventor: Alexander Oliferenko, Gainesville, FL (US)

(73) Assignee: Gestalt Chemical Products, Inc., Alachua, FL (US)

(*) Notice: Subject to any disclaimer, the term of this patent is extended or adjusted under 35 U.S.C. 154(b) by 0 days.

(21) Appl. No.: 14/412,662

(22) PCT Filed: Jul. 3, 2013

(86) PCT No.: PCT/US2013/049284
§ 371 (c)(1),
(2) Date: Jan. 2, 2015

(87) PCT Pub. No.: WO2014/008373
PCT Pub. Date: Jan. 9, 2014

(65) Prior Publication Data
US 2015/0321967 A1 Nov. 12, 2015

Related U.S. Application Data

(60) Provisional application No. 61/668,123, filed on Jul. 5, 2012.

(51) Int. Cl.
*C05C 11/00* (2006.01)
*C05C 3/00* (2006.01)
(Continued)

(52) U.S. Cl.
CPC ............ *C05C 11/00* (2013.01); *C04B 18/20* (2013.01); *C04B 18/22* (2013.01); *C04B 18/24* (2013.01);
(Continued)

(58) Field of Classification Search
CPC .......... C05C 3/00; C05C 11/00; C01B 21/00; C04B 18/20; C04B 18/22; C04B 18/24;
(Continued)

(56) References Cited

U.S. PATENT DOCUMENTS 1,499,001 A 6/1924 Carter
2,023,270 A 12/1935 Fischer et al.
(Continued)

FOREIGN PATENT DOCUMENTS

JP 62121741 11/1985

OTHER PUBLICATIONS

International Preliminary Report on Patentability and Written Opinion for PCT/US2013/049284 dated Jan. 6, 2015.
(Continued)

*Primary Examiner* — Jennifer A Smith
(74) *Attorney, Agent, or Firm* — Maxwell L. Minch; GrayRobinson, P.A.

(57) ABSTRACT

It has been discovered that waste cross-linked polymer materials both synthetic (scrap tire rubber, used polyurethane, and epoxy and phenol resins in discarded printed circuit boards) and natural (wood biomass, keratin, and chitin) can be conveniently depolymerized at slightly elevated temperatures and moderate pressures by the action of a liquid chemical reagent. The proposed inexpensive process results in a substantial to total depolymerization of synthetic polymers and thereby recovers valuable liquid and solid materials. When applied to lignocellulosic biomass, the proposed process, depending on the reaction conditions, either unlocks the lignin-hemicellulose matrix making cellulose more available for fermenting microorganisms or results in carbonization, or coalification of the biomass that may be desirable in terms of sequestering excessive carbon from the Earth's biosphere.

16 Claims, 4 Drawing Sheets

(51) Int. Cl.
*C04B 18/20* (2006.01)
*C04B 18/22* (2006.01)
*C04B 18/24* (2006.01)
*C09K 17/14* (2006.01)
*C09K 17/48* (2006.01)

(52) U.S. Cl.
CPC ............... *C05C 3/00* (2013.01); *C09K 17/14* (2013.01); *C09K 17/48* (2013.01); *Y02W 30/96* (2015.05); *Y02W 30/97* (2015.05)

(58) Field of Classification Search
CPC ......... C04B 20/023; C08J 11/10; C08J 11/18; C08J 11/28; C08J 11/00; C09K 17/14; C09K 17/48; Y02W 30/96; Y02W 30/97
See application file for complete search history.

(56) References Cited

U.S. PATENT DOCUMENTS

| | | | |
|---|---|---|---|
| 2,919,260 A * | 12/1959 | Augustin | C08K 3/346 524/445 |
| 3,725,314 A | 4/1973 | Pelofsky et al. | |
| 4,104,205 A | 8/1978 | Novotny et al. | |
| 4,161,464 A | 7/1979 | Nicholas et al. | |
| 4,211,676 A | 7/1980 | Watabe et al. | |
| 4,252,919 A | 2/1981 | Wagner et al. | |
| 4,305,850 A | 12/1981 | Watabe et al. | |
| 4,599,711 A | 7/1986 | Cuomo et al. | |
| 4,644,060 A | 2/1987 | Chou et al. | |
| 4,970,051 A | 11/1990 | Wolfsgruber et al. | |
| 5,284,625 A | 2/1994 | Isayev et al. | |
| 5,304,576 A | 4/1994 | Martinez | |
| 5,691,388 A * | 11/1997 | Bauer | C07D 251/70 521/49 |
| 5,798,394 A | 8/1998 | Myers et al. | |
| 6,077,874 A | 6/2000 | Wideman et al. | |
| 6,387,965 B1 | 5/2002 | Benko et al. | |
| 6,399,359 B1 * | 6/2002 | Hofstede | C05F 17/0258 435/262.5 |
| 6,409,841 B1 | 6/2002 | Lombard et al. | |
| 6,419,788 B1 | 7/2002 | Wingerson et al. | |
| 6,479,558 B1 | 11/2002 | Fliermans et al. | |
| 7,629,497 B2 | 12/2009 | Pringle et al. | |
| 7,868,132 B2 | 1/2011 | Chenault | |
| 8,053,566 B2 | 11/2011 | Belanger et al. | |
| 8,062,428 B2 | 11/2011 | Blair et al. | |
| 8,137,655 B2 | 3/2012 | Chornet et al. | |
| 2005/0288508 A1 | 12/2005 | Hedrick et al. | |
| 2010/0043782 A1 | 2/2010 | Kilambi et al. | |
| 2010/0132866 A1 * | 6/2010 | Imoto | C08K 7/06 152/517 |
| 2011/0053106 A1 | 3/2011 | Comolli et al. | |
| 2011/0112246 A1 | 5/2011 | Antonette et al. | |
| 2013/0217073 A1 * | 8/2013 | Chundawat | C08H 8/00 435/99 |
| 2015/0321967 A1 * | 11/2015 | Oliferenko | C01B 21/00 71/23 |

OTHER PUBLICATIONS

International Search Report corresponding to PCT/US2013/049284 dated Oct. 15, 2013.
Adikari, B, et al., "reclamation and Recycling of Waste Rubber", Prog. Polym. Sci, 2000, 25, 909-948.
Myhre, M., et al., "Rubber Recycling", Rubber Chem. Technol, 2002, 75, 429-474.

\* cited by examiner

MANUFACTURING OF NITROGEN-CONTAINING MATERIALS

CROSS REFERENCE TO RELATED APPLICATIONS

This application is the national phase under 35 U.S.C. § 371 of PCT International Application No. PCT/US2013/049284, filed Jul. 3, 2013, which claims the benefit of U.S. Provisional Application No. 61/668,123, filed on Jul. 5, 2012, the entire disclosures of which are hereby incorporated in their entirety.

TECHNICAL FIELD OF THE INVENTION

This invention relates to a process of manufacturing nitrogen-containing materials from cross-linked artificial and natural polymers and simple commercially available chemical reagents, and products thereof. One can identify a broad class of polymeric materials which are so different at a first glance, but all have one important property in common: cross-linked chemical structure forming a three-dimensional matrix. In rubber, such matrix is formed by carbon-sulfur and sulfur-sulfur chemical bonds on vulcanization. Plant biomass is kept tight and resilient due to the matrix formed from lignin and hemicellulose. The cross-linking in proteins occurs most commonly through sulfur-sulfur chemical bonds. Depolymerization or de-crosslinking of synthetic and natural polymers can be achieved by doping the said polymers with nitrogen under controlled conditions.

BACKGROUND OF THE INVENTION

One of the most important cross-linked industrial polymers is vulcanized rubber used for tire manufacturing. Recycling of waste tire rubber has been a matter of commercial interest and scientific endeavors since the invention of the rubber vulcanization process by Charles Goodyear in 1839. Early attempts using rather simple thermo-chemical means were to recover the rubber as elastomer for subsequent use in molding operations by mixing with virgin rubber. But the modern synthetic rubber such as styrene-butadiene (SBR) is more resilient and difficult to devulcanize. Attempted procedures of tire rubber devulcanization have been extensively reviewed in the scientific literature (see for example: B. Adikari, D. De, S. Maiti, Reclamation and Recycling of Waste Rubber, *Prog. Polym. Sci.*, 2000, 25, 909-948; M. Myhre, D. A. MacKillop, Rubber Recycling, *Rubber Chem. Techol.*, 2002, 75, 429-474). Very often they involved the use of harmful and bad-smelling chemicals, such as mercaptans, disulfides, mercapto- or thio acids, peroxides, aliphatic or aromatic amines, phosphines, etc. Apart from being toxic and difficult to handle, such chemicals are not available commercially in sufficient quantities to sustain large-scale, million-ton recycling operations. Use of chemicals was described, for example, in U.S. Pat. Nos. 4,211,676, 4,305,850, and 6,387,965. Phase transfer catalysis was employed in the U.S. Pat. No. 4,161,464 to facilitate distribution of devulcanization agents inside the rubber matrix. Another piece of art described in U.S. Pat. No. 5,798,394 teaches us to use a suspension of alkali metals such as sodium in aromatic solvents for the surface devulcanization of finely ground tire rubber. These and many more methods described in the patent and scientific literature rely on the use of rubber crumb or other forms of finely particulate rubber in order to increase the mass transfer and the reaction rate. This is also the case for microbiological devulcanization methods such as one described in the U.S. Pat. No. 6,479,558.

U.S. Pat. No. 3,725,314 issued to Pelofsky in 1973 heralded the use of modern physical methods such as ultrasound to rubber recycling. The use of ultrasonic energy was further developed in the U.S. Pat. Nos. 4,599,711 and 5,284,625 as well as in the Japanese patent JP 62,121,741. Microwave irradiation was another advanced devulcanization method proposed in the U.S. Pat. No. 4,104,205. U.S. Pat. No. 7,629,497 assigned to Global Resource Corporation describes a multiple-frequency microwave method for recovery of oil and carbon black from scrap tires and other carbon-based materials. The energy transfer methods although rather clean and benign compared with the above mentioned chemical methods are too energy intensive, and their scalability is a matter of debate. In addition, microwave devulcanization is most effectively applicable to polar rubber such as nitrile-butadiene or chloroprene, but much less so for nonpolar natural rubber and SBR, which are the main components of automotive tires.

Conversion of non-dietary biomass into energy and chemical feedstock has been an active area of research and development since the emerging shortage of oil and gas was identified in the 1970s. Fermentation is a natural way to process plant biomass, but the lignin matrix renders lignocellulosic materials tough and resilient. Various methods have been used to unlock the lignin matrix and to facilitate bioavailability. Kraft process has been one of the first and most abundant technologies of biomass conversion. Although the technology is rather simple and uses cheap chemicals, it generates a lot of liquid wastes and is not environmentally friendly. Acidic or alkaline hydrolysis is another old method which is still widely in the art, as exemplified, for example, by U.S. Pat. Nos. 6,409,841 and 8,062,428. Delignification methods based on extraction with near- or supercritical water or alcohols are described in the U.S. Pat. Nos. 6,419,788, 8,053,566 and in the US patent application 2010/0043782. U.S. Pat. No. 4,644,060 teaches us how to increase bioavailability of fermentable polysaccharides by the treatment with supercritical ammonia. Dry gasification of biomass-rich materials is described in the U.S. Pat. No. 8,137,655. Implementations of almost all of those methods involve high temperatures (from around 200 to 750° C.; 400-1400° F.) or high pressures (up to 300 bar; 4300 psi) or combinations thereof. Another serious problem is the recovery and purification of the used reagents such as ammonia, alcohols, and water.

Cross-linked artificial polymers such as vulcanized rubber, polyurethane, epoxy, etc. constitute a significant part of the solid wastes generated by mankind, which consumption steeply grows every year. Natural polymers such as lignocellulosic biomass (wood, straw, sugarcane bagasse, switch grass, etc.), and protein-based biomass (wool, leather, etc.) are produced due to both natural processes and human agricultural activity. Environmental, economical, and human health concerns of the growing solid waste accumulation are well known: pollution of the environment through volatilization and leaching, fire hazard, breeding of harmful insect and rodent species, usage of significant tracts of land suitable for agricultural use for landfill. Waste biomass such as yard waste, forest trimmings, and timber operation wastes also accumulates in huge amounts and only a fraction of it is processed for value added products, with the major part being incinerated for energy or just discarded. But even left discarded, biomass, as a natural polymer decays quickly, but not so artificial, man-made polymers.

However, in the emerging new era of the natural resources shortage coupled with the vital necessity to reduce carbon footprint, solid polymeric wastes can be and should be considered a viable resource rather than a nuisance. Although recycling operations are implemented in many jurisdictions and municipalities, the recycled mix is limited, and certain types of potentially recyclable wastes are neglected. Even if recycling is in place, for example, as for scrap pneumatic tires, the amount of the waste recycled constitutes just a fraction of the total waste stream. It is estimated that about 300 million automotive tires are discarded every year in the United States, but only a fraction of that amount finds a second life. For example, in 2010, according to Institute of Scrap Recycling Industries, 50 million tires were processed to produce crumb rubber and an additional 27 million were used for road and environmental engineering. It is the urgent matter of sustainability to develop economically viable methods of recovering used polymers, to turn wastes into valuable feedstock.

The art needs new and improved methods for recycling waste polymeric matter. A desired method of processing waste cross-linked polymers should be energy and cost efficient. It is expected to produce ready to use products and generate no additional waste. These requirements have been implemented in the process described herein.

SUMMARY OF THE INVENTION

According to the present invention, there is provided a process of manufacturing nitrogen-containing materials from artificial and natural cross-linked polymers which comprises impregnation of the said with a chemical reagent and then heating it up to initiate chemical reactions causing the cross-linkages to break or be destroyed and the polymeric materials to depolymerize. Another useful consequence of this process is carbonization or coalification of the treated organic matter.

According to the present invention, there is provided a process for depolymerization of artificial and natural cross-linked polymers which comprises impregnation of the said with a chemical reagent and then heating it up to initiate chemical reactions causing the cross-linkages to destroy and the polymeric materials to depolymerize. Another useful consequence of this process is carbonization or coalification of the treated organic matter.

One aspect is a process comprising combining a polymeric material and a chemical reagent in a reaction vessel, wherein the chemical reagent is made by combining a nucleophilic agent and an electrophilic agent. Another aspect is any process herein wherein the pressure in the reaction vessel ranges from between about 1 bar to 275 bar (from 14.5 to 4,000 psi) (e.g., including any range within 1 bar to 275 bar).

Another aspect is a process comprising:
(a) combining polymeric material and a chemical reagent in a reaction vessel, wherein the chemical reagent is made by combining a nucleophilic agent and an electrophilic agent;
(b) heating the contents of the said reaction vessel to a temperature of between about 20-250° C.

Other aspects include a process herein:
wherein the reaction vessel is hermetically sealed while heating the contents of the said reaction vessel;
wherein the reaction vessel is under external pressure while heating the contents of the said reaction vessel;
wherein the heating is at a maximum temperature of between about 50-250° C.;
wherein the heating is at a maximum temperature of between about 100-200° C.;
wherein the heating is at a maximum temperature of between about 50-250° C. for between about 1 minute and 24 hours;
wherein the heating is conducted with the pressure in the reaction vessel ranging from between about 1 bar to 275 bar (from 14.5 to 4,000 psi);
further comprising allowing the heated reaction vessel to cool to room temperature;
further comprising allowing the polymeric material and chemical reagent mixture to remain in the reaction vessel at room temperature for between about 1 to 600 minutes prior to heating;
wherein the nucleophilic agent is an amine compound;
wherein the nucleophilic agent is ammonia;
wherein the nucleophilic agent is anhydrous ammonia;
wherein the electrophilic agent is a haloalkane;
wherein the electrophilic agent is a chloroalkane;
wherein the electrophilic agent is dichloromethane;
wherein the nucleophilic agent and the electrophilic agent are in a mole-to-mole ratio which ranges from about 1:10 to 10:1, respectively;
wherein the polymeric material is a cross-linked synthetic polymeric material;
wherein the polymeric material is scrap tires, discarded polyurethane items, used PET bottles, scrap PVC items, or printed circuit boards;
wherein the polymeric material is natural cross-linked polymeric materials of plant or animal origin;
wherein the polymeric material is wood, switchgrass, corn stover, sugarcane bagasse, straw, algae, seaweed, peat, lignite, coal, leather, tanning waste, wool, other keratin-containing animal products, fabric cuttings, or chitin.

One aspect, is a product made by a process delineated herein.

One aspect, is a method of conditioning soil, comprising applying a product of any of the processes delineated herein to soil.

One aspect, is a method of fertilizing soil, comprising applying a product of any of the processes delineated herein to soil.

One aspect, is a method of sustained-release watering of soil, comprising applying a product of any of the processes delineated herein to soil. In other aspects, the product of any of the processes delineated herein is combined with water (e.g., either before or after combining the material with soil).

One aspect, is a method of tinting or coloring a material, comprising combining the material with a product of any of the processes delineated herein. In other aspects, the material is a cement or a polymer.

One aspect, is a method of filtering an aqueous or non-aqueous stream, comprising combining the aqueous or non-aqueous stream with a product of any of the processes delineated herein.

Other aspects include:
a recreational field comprising a product of any of the processes delineated herein;
an agricultural field comprising a product of any of the processes delineated herein;
a cement comprising a product of any of the processes delineated herein;
a battery comprising a product of any of the processes delineated herein;
a capacitor comprising a product of any of the processes delineated herein.

The chemical reagent is prepared by mixing a nucleophilic agent, or component and an electrophilic agent, or component. The terms "nucleophilic" and "electrophilic" are well known to those skilled in the art of applying organic chemistry concepts to industrial improvements. In a preferred embodiment of this invention the nucleophilic component is selected from an array of nitrogen-, oxygen-, phosphorus-, and sulfur-containing nucleophiles. In a more preferred embodiment of this invention, the nucleophilic component is selected from an array of amine compounds, including ammonia, alkylamines, arylamines, hydrazine, and alkyl-substituted hydrazines. In the most preferred embodiment of this invention the nucleophilic agent is ammonia, as the most abundant and cheap representative of nucleophilic compounds. The electrophilic component is selected from an array of organic compounds which contain good leaving groups rendering the chemical compound a good electrophile. In a more preferred embodiment of this invention, the electrophilic agent is selected from an array of haloalkanes such as fluoro, chloro, bromo, and iodo-substituted alkanes having the generic chemical formula $C_nH_{2n+1}X_m$, where n may vary in the range 1-100, and m may take values defined by the formula m=2n+1. In the most preferred embodiment of this invention the electrophilic agent is dichloromethane having the chemical formula $CH_2Cl_2$. The nucleophilic agent and the electrophilic agent are mixed in the mole-to-mole ratio which ranges from 1:100 to 100:1, with a more preferred ratio range of 1:10 to 10:1, and with the most preferred ratio of 1:1. Heating and pressure increases the reaction rates and promotes the formation of desired value-added products.

One aspect is to conduct the process in a sealed vessel to contain the reaction mixture at prescribed operating conditions and ensure the liquid state of all the components of the chemical reagent. The process operating conditions such as temperature, pressure, residence time, and other variables may vary in rather wide ranges, and such variation of the process operating conditions enables one to control the yield and characteristics of the resultant reaction product. For example, by a judicious selection of operating conditions of the proposed process, scrap automotive tires can be converted to a palette of highly useful value-added products including sponge rubber of high water absorbing capacity, recovered elastomer, carbon black, nitrogen-doped carbonaceous materials, and slow-release fertilizers. In another example, depending on the operating conditions plant biomass can be substantially softened to make the carbohydrates more available for fermentation or converted to a carbonized material useful as a means of sequestering excessive carbon from the Earth's biosphere.

It is an object of the present invention to provide an efficient energy-saving method of depolymerization and carbonization of the treated polymeric materials at the temperatures much lower comparing to those used in the prior art, with the preferred ones being in the range 50-250° C. (120-482° F.), with more preferred in the range 100-170° C. (220-338° F.), even more preferred in the range 120-150° C. (250-300° F.), and the most preferred in the range 80-120° C. (176-248° F.).

It is another object of the present invention to make possible utilization of whole tires, as shredding, grinding or other sorts of comminution employed in the prior art greatly increase the production cost, because tire rubber is a notoriously tough and resilient material. The proposed process enables one skillful in the art to feed whole tires into the reaction vessel and thus to avoid costs related to tire cutting and grinding as well as separation of the non-rubber tire components such as steel and fiber. The steel and fiber components can be much easier separated from the product, which constitute a soft, easily dispersible material.

We have discovered that a special mixed chemical reagent applied at moderate temperatures and pressures causes formation of useful nitrogen-containing materials through depolymerization of many types of cross-linked artificial and natural polymers such as rubber, epoxy resins, lignocellulosic materials, leather, wool or similar. We have also discovered that in addition to depolymerization, the said reagent causes carbonization or coalification of organic matter, including the above mentioned cross-linked artificial and natural polymers as well as polymers, resins, and various sorts of biomass.

DETAILED DESCRIPTION

Compounds and Definitions

Figure 1:
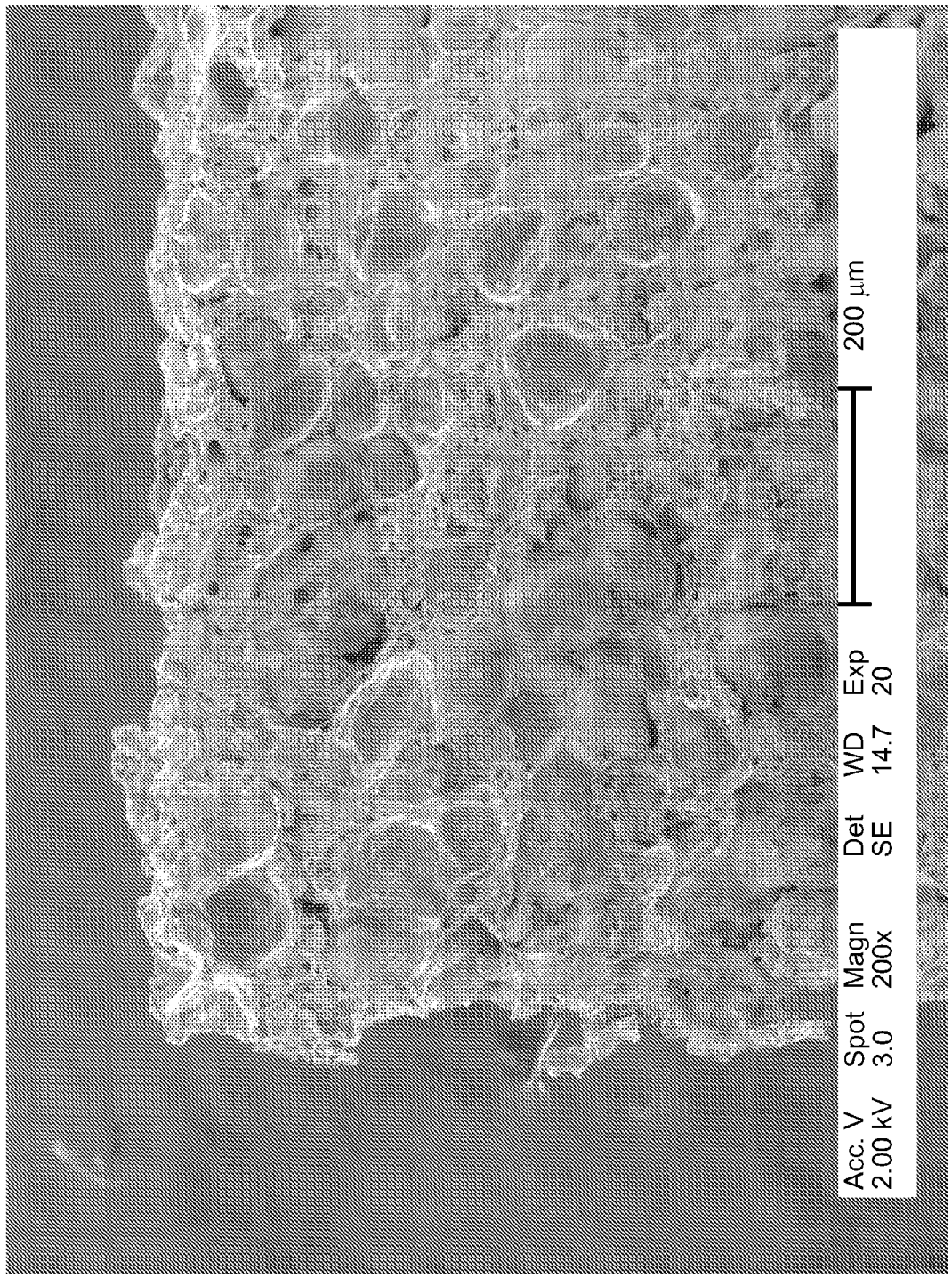
FIG. 1. is a scanning electron microscope (SEM) image of a thin slice of tire rubber treated according to Example 2.

Unless otherwise stated, chemical compounds and structures recited or depicted herein are also meant to include all isomeric (e.g., enantiomeric, diastereomeric, and geometric (or conformational)) forms of the structure; for example, the R and S configurations for each asymmetric center, Z and E double bond isomers, and Z and E conformational isomers. Therefore, single stereochemical isomers as well as enantiomeric, diastereomeric, and geometric (or conformational) mixtures of the present compounds are within the scope of the invention. Unless otherwise stated, all tautomeric forms of the compounds of the invention are within the scope of the invention. All such isomeric forms of these compounds are expressly included in the present invention. The compounds of this invention may also be represented in multiple tautomeric forms, in such instances, the invention expressly includes all tautomeric forms of the compounds described herein. All such isomeric forms of such compounds are expressly included in the present invention. All crystal forms of the compounds described herein are expressly included in the present invention.

As used herein, the term "halo" or "halogen" refers to any radical of fluorine, chlorine, bromine or iodine.

The terms "alk" or "alkyl" refer to straight or branched chain hydrocarbon groups having 1 to 12 carbon atoms, preferably 1 to 8 carbon atoms. The expression "lower alkyl" refers to alkyl groups of 1 to 4 carbon atoms (inclusive). The term "arylalkyl" refers to a moiety in which an alkyl hydrogen atom is replaced by an aryl group. The term "alkenyl" refers to straight or branched chain hydrocarbon groups of 2 to 10, preferably 2 to 4, carbon atoms having at least one double bond. Where an alkenyl group is bonded to a nitrogen atom, it is preferred that such group not be bonded directly through a carbon bearing a double bond.

The term "alkoxy" refers to an —O-alkyl radical. The term "alkylenedioxo" refers to a divalent species of the structure —O—R—O—, in which R represents an alkylene.

The term "haloalkyl" refers to an alkyl substituent that is fully or partially substituted with Cl, F, I or Br or any combination thereof. Examples of haloalkyl groups include dichloromethyl, trifluoromethyl, and 2,2,2-trifluoroethyl.

The term "haloalkoxy" refers to an —O-alkyl substituent where the alkyl is fully or partially substituted with Cl, F, I or Br or any combination thereof. Examples of haloalkoxy groups include trifluoromethoxy and 2,2,2-trifluoroethoxy.

The term "alkynyl" refers to straight or branched chain hydrocarbon groups of 2 to 10, preferably 2 to 4, carbon atoms having at least one triple bond. Where an alkynyl group is bonded to a nitrogen atom, it is preferred that such group not be bonded directly through a carbon bearing a triple bond.

The term "alkylene" refers to a divalent straight chain bridge of 1 to 5 carbon atoms connected by single bonds (e.g., —(CH$_2$)$_x$—, wherein x is 1 to 5), which may be substituted with 1 to 3 lower alkyl groups.

The terms "cycloalkyl" and "cycloalkenyl" as employed herein includes saturated and partially unsaturated cyclic, respectively, hydrocarbon groups having 3 to 12 carbons, preferably 3 to 8 carbons, and more preferably 3 to 6 carbons. The terms "Ar" or "aryl" refer to aromatic cyclic groups (for example 6 membered monocyclic, 10 membered bicyclic or 14 membered tricyclic ring systems) which contain 6 to 14 carbon atoms. Exemplary aryl groups include phenyl, naphthyl, biphenyl and anthracene.

"Heteroaryl" refers to a monocyclic or fused ring (i.e., rings which share an adjacent pair of atoms) group of 5 to 12 ring atoms containing one, two, three or four ring heteroatoms selected from N, O, or S, the remaining ring atoms being C, and, in addition, having a completely conjugated pi-electron system, wherein 0, 1, 2, 3, or 4 atoms of each ring may be substituted by a substituent. Examples, without limitation, of heteroaryl groups are pyrrole, furan, thiophene, imidazole, oxazole, thiazole, pyrazole, pyridine, pyrimidine, quinoline, quinazoline, isoquinoline, purine and carbazole.

The terms "heterocycle", "heterocyclyl", "heterocyclic" or "heterocyclo" refer to fully saturated or partially unsaturated cyclic groups, for example, 3 to 7 membered monocyclic, 7 to 12 membered bicyclic, or 10 to 15 membered tricyclic ring systems, which have at least one heteroatom in at least one ring, wherein 0, 1, 2 or 3 atoms of each ring may be substituted by a substituent. Each ring of the heterocyclic group containing a heteroatom may have 1, 2, 3 or 4 heteroatoms selected from nitrogen atoms, oxygen atoms and/or sulfur atoms, where the nitrogen and sulfur heteroatoms may optionally be oxidized and the nitrogen heteroatoms may optionally be quaternized. The heterocyclic group may be attached at any heteroatom or carbon atom of the ring or ring system.

Where a particular enantiomer is preferred, it may, in some embodiments be provided substantially free of the corresponding enantiomer, and may also be referred to as "optically enriched." "Optically-enriched," as used herein, means that the compound is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques et al., *Enantiomers, Racemates and Resolutions* (Wiley Interscience, New York, 1981); Wilen, et al., *Tetrahedron* 33:2725 (1977); Eliel, E. L. *Stereochemistry of Carbon Compounds* (McGraw-Hill, N.Y., 1962); Wilen, S. H. *Tables of Resolving Agents and Optical Resolutions* p. 268 (E. L. Eliel, Ed., Univ. of Notre Dame Press, Notre Dame, Ind. 1972).

The compounds delineated herein are commercially available from and/or can be synthesized using standard methods and reagents known in the art. The synthesized compounds can be separated from a reaction mixture and further purified by a method such as column chromatography, high pressure liquid chromatography, or recrystallization. As can be appreciated by the skilled artisan, further methods of synthesizing the compounds of the formulae herein will be evident to those of ordinary skill in the art. Additionally, the various synthetic steps may be performed in an alternate sequence or order to give the desired compounds. In addition, the solvents, temperatures, reaction durations, etc. delineated herein are for purposes of illustration only and one of ordinary skill in the art will recognize that variation of the reaction conditions can produce the desired products of the present invention.

The specific approaches and compounds shown above are not intended to be limiting. The chemical structures in the schemes herein depict variables that are hereby defined commensurately with chemical group definitions (moieties, atoms, etc.) of the corresponding position in the compound formulae herein, whether identified by the same variable name (e.g., R$^1$, R$^2$, R, R', X, etc.) or not. The suitability of a chemical group in a compound structure for use in synthesis of another compound structure is within the knowledge of one of ordinary skill in the art. Additional methods of synthesizing compounds herein and their synthetic precursors, including those within routes not explicitly shown in schemes herein, are within the means of chemists of ordinary skill in the art. Methods for optimizing reaction conditions, if necessary minimizing competing by-products, are known in the art. The methods described herein may also additionally include steps, either before or after the steps described specifically herein, to add or remove suitable protecting groups in order to ultimately allow synthesis of the compounds herein. In addition, various synthetic steps may be performed in an alternate sequence or order to give the desired compounds. Synthetic chemistry transformations and protecting group methodologies (protection and deprotection) useful in synthesizing the applicable compounds are known in the art and include, for example, those described in R. Larock, *Comprehensive Organic Transformations*, VCH Publishers (1989); T. W. Greene and P. G. M. Wuts, *Protective Groups in Organic Synthesis*, 3$^{rd}$ Ed., John Wiley and Sons (1999); L. Fieser and M. Fieser, *Fieser and Fieser's Reagents for Organic Synthesis*, John Wiley and Sons (1994); and L. Paquette, ed., *Encyclopedia of Reagents for Organic Synthesis*, John Wiley and Sons (1995) and subsequent editions thereof.

The compounds of this invention may be modified by appending various functionalities via any synthetic means delineated herein to enhance selective biological properties. Such modifications are known in the art and include those which increase biological penetration into a given biological system (e.g., blood, lymphatic system, central nervous system), increase oral availability, increase solubility to allow administration by injection, alter metabolism and alter rate of excretion.

The recitation of a listing of chemical groups in any definition of a variable herein includes definitions of that variable as any single group or combination of listed groups.

The recitation of an embodiment for a variable herein includes that embodiment as any single embodiment or in combination with any other embodiments or portions thereof. The recitation of an embodiment herein includes that embodiment as any single embodiment or in combination with any other embodiments or portions thereof.

As used herein, the term "acceptable salt" refers to those salts of the compounds herein. The salts can be prepared in situ during the final isolation and purification of the compounds of the invention, or separately by reacting the free base function with a suitable organic acid. Examples of acceptable salts include, but are not limited to, nontoxic acid addition salts, or salts of an amino group formed with inorganic acids such as hydrochloric acid, hydrobromic acid, phosphoric acid, sulfuric acid and perchloric acid or with organic acids such as acetic acid, maleic acid, tartaric acid, citric acid, succinic acid or malonic acid or by using other methods used in the art such as ion exchange. Representative alkali or alkaline earth metal salts include sodium, lithium, potassium, calcium, or magnesium salts, and the like. Further acceptable salts include, when appropriate, nontoxic ammonium, quaternary ammonium, and amine cations formed using counterions such as halide, hydroxide, carboxylate, sulfate, phosphate, nitrate, alkyl having from 1 to 6 carbon atoms, sulfonate and aryl sulfonate.

Combinations of substituents and variables envisioned by this invention are only those that result in the formation of stable compounds. The term "stable", as used herein, refers to compounds which possess stability sufficient to allow manufacture and which maintains the integrity of the compound for a sufficient period of time to be useful for the purposes detailed herein.

Compounds and compositions described herein are generally useful for a variety of applications, including those delineated herein.

Another object of the present invention is the use of a compound or composition thereof as described herein (e.g., of any formulae herein) in the manufacture of a material for use as described herein. Another object of the present invention is a compound as described herein (e.g., of any formulae herein; product of any process herein) for any use as described herein.

As used herein, the term "combination," "combined," and related terms refers to the simultaneous or sequential administration of agents in accordance with this invention.

The recitation of a listing of chemical groups in any definition of a variable herein includes definitions of that variable as any single group or combination of listed groups. The recitation of an embodiment for a variable herein includes that embodiment as any single embodiment or in combination with any other embodiments or portions thereof. The recitation of an embodiment herein includes that embodiment as any single embodiment or in combination with any other embodiments or portions thereof.

Polymeric Materials Subject to Depolymerization and Nitrogen Doping

The proposed process is able to convert many types of industrial and natural waste materials into valuable nitrogen-containing materials that can be used as fertilizers, soil amendments, colorants, and electrode materials. Very often polymeric feedstock for this process are cross-linked synthetic polymeric materials such as scrap tires, discarded polyurethane items, used PET bottles, scrap PVC items, printed circuit boards, and similar. Natural polymeric materials of plant origin include wood, switchgrass, corn stover, sugarcane bagasse, straw, algae, seaweed, peat, lignite, coal, and similar. Natural cross-linked polymeric materials of animal origin include leather, tanning waste, wool, other keratin-containing animal products, fabric cuttings, chitin, and similar.

An important prerequisite is the ability of the polymeric material to swell in the chemical reagent or to absorb the reagent in sizeable amounts.

Chemical Reagent

The chemical reagent is prepared by mixing a nucleophilic component and an electrophilic component. The terms "nucleophilic" and "electrophilic" are well known to those skilled in the art of applying organic chemistry concepts to industrial improvements. In a general chemical meaning, nucleophilic (electrophilic) agent is one that prefers to act as a nucleophile (electrophile) in chemical reactions classified as nucleophilic substitution reactions. In a preferred embodiment of this invention the nucleophilic agent is selected from an array of nitrogen-, oxygen-, phosphorus-, and sulfur-containing nucleophiles, such as those depicted in Scheme 1:

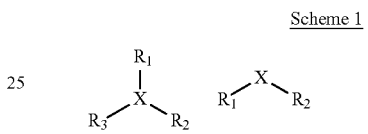

Scheme 1 wherein X is selected from the atoms N, P, O, and S, and $R_1$ to $R_3$ are each independently a hydrogen atom (H) or a $C_1$-$C_{18}$ alkyl, haloalkyl, aminoalkyl, hydroxyalkyl group that may be a straight chain or a branched radical or a cycloalkyl group. In a more preferred embodiment of this invention, the nucleophilic agent is selected from amine compounds such as ammonia, alkylamines, arylamines, hydrazine, and alkyl-substituted hydrazines. In the most preferred embodiment of this invention the nucleophilic agent is ammonia, as the most abundant and cheap representative of nucleophilic compounds.

The electrophilic agent is selected from a wide array of organic compounds which contain good leaving groups rendering the chemical compound a good electrophile. Preferred leaving groups are —F, —Cl, —Br, —I, —$OSO_2OH$, —$OSO_2OCH_3$, —$OSO_2F$, —$OSO_2CH_3$, —$OSO_2CF_3$, —OTs (tosylate), and similar. In a more preferred embodiment of this invention, the electrophilic agent is selected from an array of haloalkanes such as fluoro, chloro, bromo, and iodo-substituted alkanes having the generic chemical formula $C_nH_{2n+1}X_m$. where n may vary in the range 1-100, and m may take values defined by the formula m=2n+1, and where X can be either any of the individual halogen atoms such as F, Cl, Br, and I or any combination of those. In the most preferred embodiment of this invention the electrophilic agent is a geminal or vicinal dichloro-substituted hydrocarbon, with the best choice being dichloromethane (also known to one having skill in the art as methylene chloride) or 1,2-dichloroethane (ethylene dichloride) or a mixture thereof.

The nucleophilic agent and the electrophilic agent are mixed in the mole-to-mole ratio which ranges from 1:100 to 100:1, with a more preferred ratio range of 1:10 to 10:1, and with the most preferred ratio of 1:1. Such a mixture made of a polar and more hydrophilic substance (ammonia or a primary amine) and a highly hydrophobic substance (dichloromethane or another haloalkane) is capable to penetrate three-dimensional matrices of many artificial and natural cross-linked polymers, both hydrophobic such as rubber and hydrophilic such as biomass. For example, in the most preferred embodiment, the chemical reagent consists of liquid ammonia and dichloromethane, which are completely miscible with each other in a wide range of temperatures and pressures. Such miscibility renders many types of cross-linked polymers to undergo a uniform swelling if placed into such liquid phase. The above described preferred ratios do not prevent one from using more extended ratios of the nucleophilic and electrophilic components or from practicing the invention using just the pure components, either the nucleophilic or electrophilic ones. For example, it has been found that in some cases ammonolysis with pure liquid ammonia with no electrophilic component added gave good results.

Processes

A contemplated process based on using the said chemical reagent comprises the following steps:

1) Charging a reaction vessel with the polymeric feedstock and the said chemical reagent in the ratio ranging from 100:1 to 1:100, with a more preferred ratio from 10:1 to 1:10, and the most preferred range of ratios as 5:1 to 1:5.

2) Heating the content of the said reaction vessel until the temperature reaches a preferred range of 50-250° C. (120-482° F.), with a more preferred range of 100-170° C. (220-338° F.), and the most preferred range of 120-150° C. (250-300° F.).

3) Keeping the said charge of the reaction vessel at the preferred temperature (cooking) for the residence time sufficient for the reaction to complete. The cooking step takes preferably from 15 minutes to 24 hours, with a more preferred residence time being between 30 minutes and 12 hours. In the course of the reaction, the pressure (either autogenic or externally delivered) in the reaction vessel may increase to 350 bar (approximately 5000 psi), with a more preferred pressure ranging from 1 bar to 275 bar (from 14.5 to 4,000 psi), and the most preferred pressure being 112 bar (1,624 psi). The most preferred pressurized gases to maintain the preferred pressure is nitrogen, although air can be used pursuant to a proper safety analysis. In certain cases carbon dioxide can also be used.

4) Chilling down the content of the reaction vessel to ambient temperature and discharging the cooked product from the reactor.

5) Separation of the reaction product to recover useful reaction products such as steel, sponge rubber, recycled liquid elastomer, carbon black, nitrogen-doped carbonaceous materials, and fertilizers.

Another contemplated process based on using the said chemical reagent comprises the following steps:

1) Charging a reaction vessel with the polymeric feedstock and the said chemical reagent in the ratio ranging from 100:1 to 1:100, with a more preferred ratio from 10:1 to 1:10, and the most preferred range of ratios as 5:1 to 1:5.

2) Heating the content of the said reaction in a hermetically sealed vessel until the temperature reaches a preferred range of 50-250° C. (120-482° F.), with a more preferred range of 80-170° C. (160-338° F.), and the most preferred range of 85-120° C. (185-248° F.). Caution: heating in a hermetically sealed vessel at the temperature exceeding 120° C. may result in a self-accelerating reaction accompanied by a significant increase in temperature and pressure.

3) Keeping the said charge of the reaction vessel at the preferred temperature (cooking) for the residence time sufficient to the reaction to complete. The cooking step takes preferably from 15 minutes to 24 hours, with a more preferred residence time being between 30 minutes and 12 hours. In the course of the reaction, the pressure (either autogenic or externally delivered) in the reaction vessel may increase to 350 bar (approximately 5000 psi), with a more preferred pressure ranging from 1 bar to 275 bar (from 14.5 to 4,000 psi), and the most preferred pressure being 22 bar (320 psi). The most preferred pressurized gases to maintain the preferred pressure is nitrogen, although air or noble gases can be used pursuant to a proper safety analysis.

4) Chilling down the content of the reaction vessel to ambient temperature and discharging the cooked product from the reactor.

5) Separation of the reaction product to recover useful reaction products such as steel, sponge rubber, recycled liquid elastomer, carbon black, nitrogen-doped carbonaceous materials, and fertilizers.

Putative Reaction Mechanism

The process operating conditions such as temperature, pressure, residence time, and other variables may vary in rather wide ranges, and such variation of the process operating conditions enables one to control the yield and characteristics of the resultant reaction product. Several types of reaction products can be obtained in the course of practicing this invention including sponge rubber, recovered liquid elastomer, carbon black, nitrogen-doped carbonaceous materials, and fertilizers.

Not bound by any theory, we assume that by varying the operating conditions one can switch the reaction mechanism between nucleophilic substitution and elimination, reaction mechanisms well known to those skilled in the art.

At the operating temperature between 50 and 120° C. (120-250° F.), it is assumed that the preferred reaction mechanism is nucleophilic substitution, in which the amine compound, preferably ammonia serves as nucleophile and the haloalkane compound serves as electrophile to afford nucleophilic substitution reactions. Contemplated reaction products of such reactions are ammonium salts and nitrogen-containing organic compounds. If ammonia and dichloromethane are taken as components of the preferred chemical reagent, the reaction products consist of ammonium chloride ($NH_4Cl$) and hexamethylenetetramine (urotropine, or hexamine), according to the reaction scheme proposed in the U.S. Pat. No. 1,499,001 which was granted to Carter in 1924:

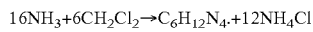
$16NH_3 + 6CH_2Cl_2 \rightarrow C_6H_{12}N_4 + 12NH_4Cl$

Figure 2:
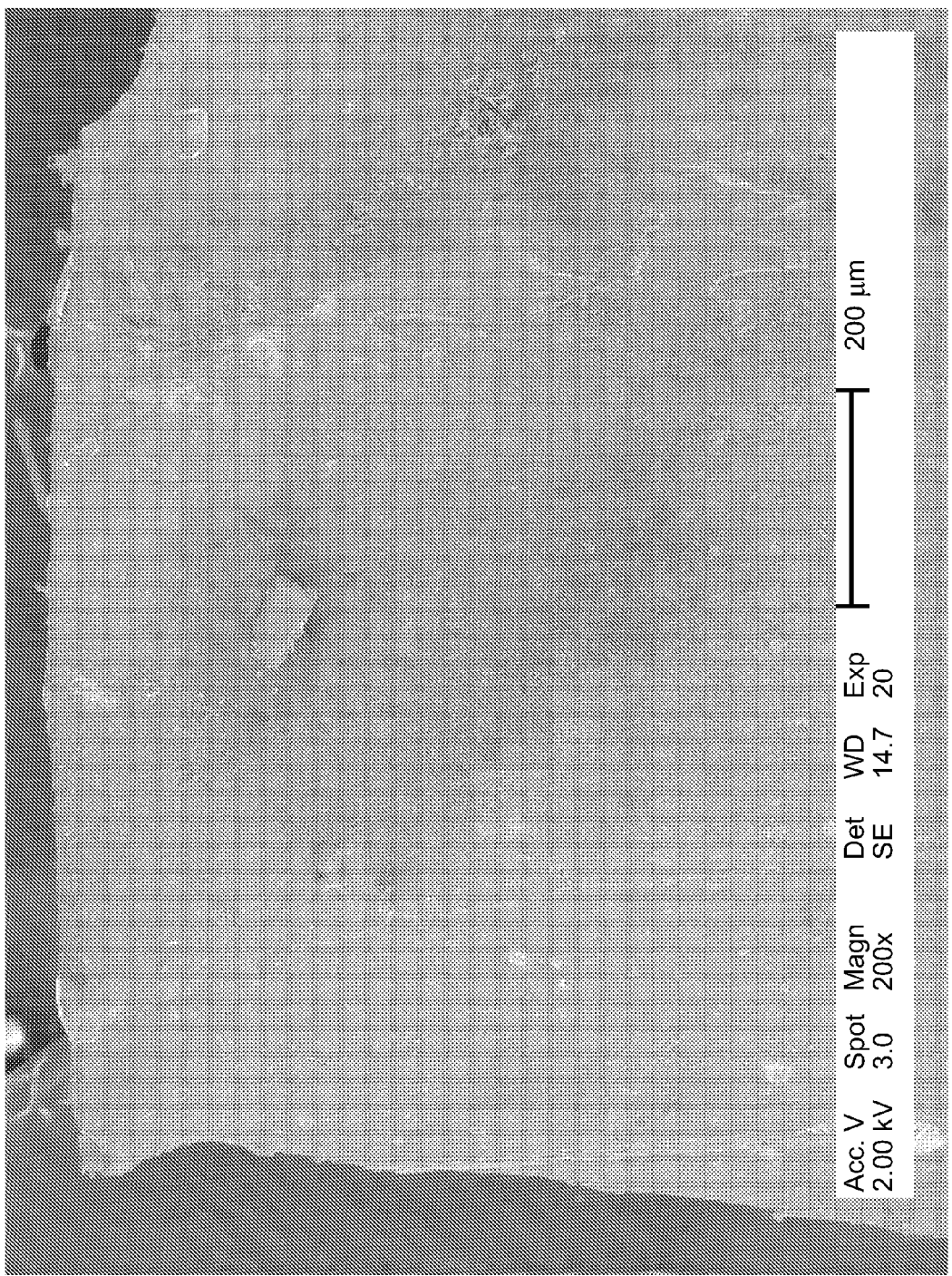
FIG. 2. is a SEM image of a thin slice of untreated tire rubber.

Carter described the above reaction solely as a new way of manufacturing hexamethylenetetramine, with no regard to depolymerization or nitrogen doping of natural or artificial polymers. Also, Carter did not provide any mechanistic details, but, with regard to vulcanized rubber it is assumed that transient reaction intermediates are formed in the course of the above reaction that attack chemical cross links, particularly C—S, S—S, C—O, C—N, and C=C bonds, which result in a substantial degree of depolymerization and loosening of the original polymeric material. In the case of vulcanized rubber this leads to the formation of internal cavities in which the nascent reaction products deposit. A judiciously chosen cooking regime, as indicated above, results in a certain sort of sponge rubber densely filled with a mixture of $NH_4Cl$ and hexamine formed in situ as products. Scanning electron microscopy images of thin slices of the sponge rubber material and untreated rubber (as a reference) are given in FIGS. 1 and 2. The sponge rubber material can be conveniently shredded into small pieces and packed for further use as, for example, a combined agricultural formulation of soil conditioner and nitrogen fertilizer.

Importantly, the shear force necessary to shred such sponge rubber is approximately 5-10 times smaller than that necessary to shred untreated tire rubber The plurality of possible reaction pathways is not limited to nucleophilic substitution and may also involve elimination reactions. As has been discovered in the course of the experimental work that resulted in the present invention, one of the elimination pathways may involve dehydrohalogenation, if the operating temperature is higher than 120° C. (250° F.). If ammonia and dichloromethane are taken as components of the preferred chemical reagent, the reaction may occur to generate unstable chloromethylamine Cl—CH$_2$—NH$_2$, which almost instantly undergoes dehydrohalogenation to afford azomethine H$_2$C=NH, which is also unstable and instantly disproportionates into methylamine CH$_3$NH$_2$ and hydrogen cyanide HCN, as shown in the scheme:

NH$_3$+CH$_2$Cl$_2$→Cl—CH$_2$—NH$_2$.+HCl

Cl—CH$_2$—NH$_2$→H$_2$C=NH.+HCl

2H$_2$C=NH→CH$_3$NH$_2$.+HCN

Under the reaction conditions employed, the HCN formed is instantly scavenged by the excess of ammonia to afford ammonium cyanide, and the said cyanide CN$^-$ immediately attacks the C—S and S—S bonds to extract sulfur and to form non-hazardous thiocyanate SCN$^-$, as shown below:

NH$_3$+HCN→NH$_4$CN

CN$^-$+S→SCN$^-$

This reaction pathway was not considered by Carter in the U.S. Pat. No. 1,499,001 which was granted to him in 1924. To the best of our knowledge, this reaction pathway has never been discussed in the patent or academic literature. The peculiar characteristic of this reaction pathway is that it can develop an exothermic reaction accompanied by a significant increase in temperature and pressure, which can be explained by the base-catalyzed polymerization of the nascent hydrogen cyanide (see, for example, Industrial & Engineering Chemistry, 1925, vol. 17, pp. 1074-1081).

It is well known to one having skill in the art that cyanide anion is the most thiophilic species, that is the one possessing the highest affinity toward divalent sulfur (see, for example: Shigeru Oae, *Organic Chemistry of Sulfur*, N.Y: Plenum Press, 1977). Given the reaction mechanism relevant to the temperature range of 120-150° C. (250-300° F.) it is now justified to assume that one of the main reasons of the total depolymerization of tire rubber and other sulfur cross-linked polymers is the strong degrading action of the transient CN$^-$ species upon the cross-linked 3D structure. Another pathway of cyanide decomposition relevant to non-sulfur-crosslinked polymers such as biomass is oxidation to cyanate or isocyanate followed by condensation with cellulosic hydroxyl groups and an excess of ammonia. The operating regime at the temperature range of 120-150° C. (250-300° F.) generates a black dispersable powder, which more preferably consists of carbon black and nitrogen-doped carbonaceous material with an admixture of NH$_4$Cl that can be conveniently separated by washing with water. The black powdery material comprising carbon black and a nitrogen-doped carbonaceous material can be used as, for example, an electrode material, a colorant or a filtration material.

Advantages of the Proposed Process

One advantage of the process of the present invention over previous processes is the lower operating temperature, which preferably does not exceed 150° C. (300° F.).

A second advantage of the present process over previous art is the preferred use of non-shredded or otherwise size reduced waste polymeric materials (whole tires, larger pieces of plant biomass). This drastically eliminates the expenses associated with shredding, grinding or other means of size reduction.

Yet another advantage of the process of the present invention over previous processes is the use of inexpensive and commercially available starting materials (anhydrous ammonia and chlorinated hydrocarbons).

A further advantage is the possibility of using waste chlorinated solvents as a component of the chemical reagent described in this invention. It is well known that accumulation, transportation, and incineration of waste chlorinated solvents constitute a serious threat to the environment and should be significantly reduced. The use of such waste solvents in the present invention nicely illustrates the proposed novel concept of eliminating waste by waste: Action of one waste upon another waste leaves no waste but instead generates valuable products.

Still another advantage of the proposed process is the advantageous use of catalysis which does not require any exogenously added catalyst, because some important waste streams (for example, scrap tires) by design contain necessary amounts of catalyst. It has been discovered in the course of the present invention that common constituents of automotive tires such as carbon black and zinc oxide both serve as catalysts in the described reactions, resulting in a significant increase in the reaction rates. This was confirmed by carrying out control experiments, i.e., by running the same reactions with no rubber added: the yields and speciation of the reaction products were sharply different compared to the runs with rubber added.

Reaction Products and their Possible Applications

The reaction products that can be produced by one skilled in the art practicing the present invention are useful and valuable materials with a distinct commercialization potential. According to the description of the reaction mechanisms given above, various reaction products can be obtained, which are tentatively divided pursuant to their nature and possible application.

1) Upon moderate temperatures, not exceeding 120° C. (250° F.), the major product of scrap tire processing is sponge rubber filled with a mixture of NH$_4$Cl and hexamethylenetetramine, which are well known as nitrogen fertilizers. It has been found that such "stuffed" sponge rubber slowly releases the fertilizer components (NH$_4$Cl and hexamethylenetetramine) when placed in water. Remarkably, the release of the fertilizer is accompanied by a significant water intake, taking in the amount of water up to four times greater than the original weight of the untreated rubber. This observation means that this spongy material can serve both as a controlled-release fertilizer and an effective water-retaining agent. Such sponge rubber can be conveniently shredded into small pieces (more preferably ½ inch) and packed for further use as an innovative agricultural formulation having properties of slow-release nitrogen fertilizer, soil conditioner, bulking agent, aerating agent, and water-retaining agent. A somewhat similar design was described long ago in the U.S. Pat. No. 2,023,270 issued in 1935, but in that disclosure the sponge rubber material was made from virgin rubber and then intentionally impregnated with fertilizer, whereas in the present invention the sponge fertilizer-filled rubber material is created in one run from waste tires, not from virgin rubber. The said material will be particularly useful in supporting vegetation in nutrient-poor, clayish, extremely dry or water-logged soils (for example, in land reclamation after oil sands mining) It can also be used as a soil amendment agent in sod production or where lightweight growth media are needed such as green roof designs.

2) Upon the same reaction temperature, the major product of wood biomass processing can be better described as softened wood that lost almost all its resilience and as a result can be much easier pounded into fine particles. It is justified to assume that such treatment unlocks the lignin-hemicellulose matrix and makes the wood biomass more accessible to fermenting microorganisms or further chemical processing. This observation makes the present invention highly relevant to biofuel production.

Figure 3:
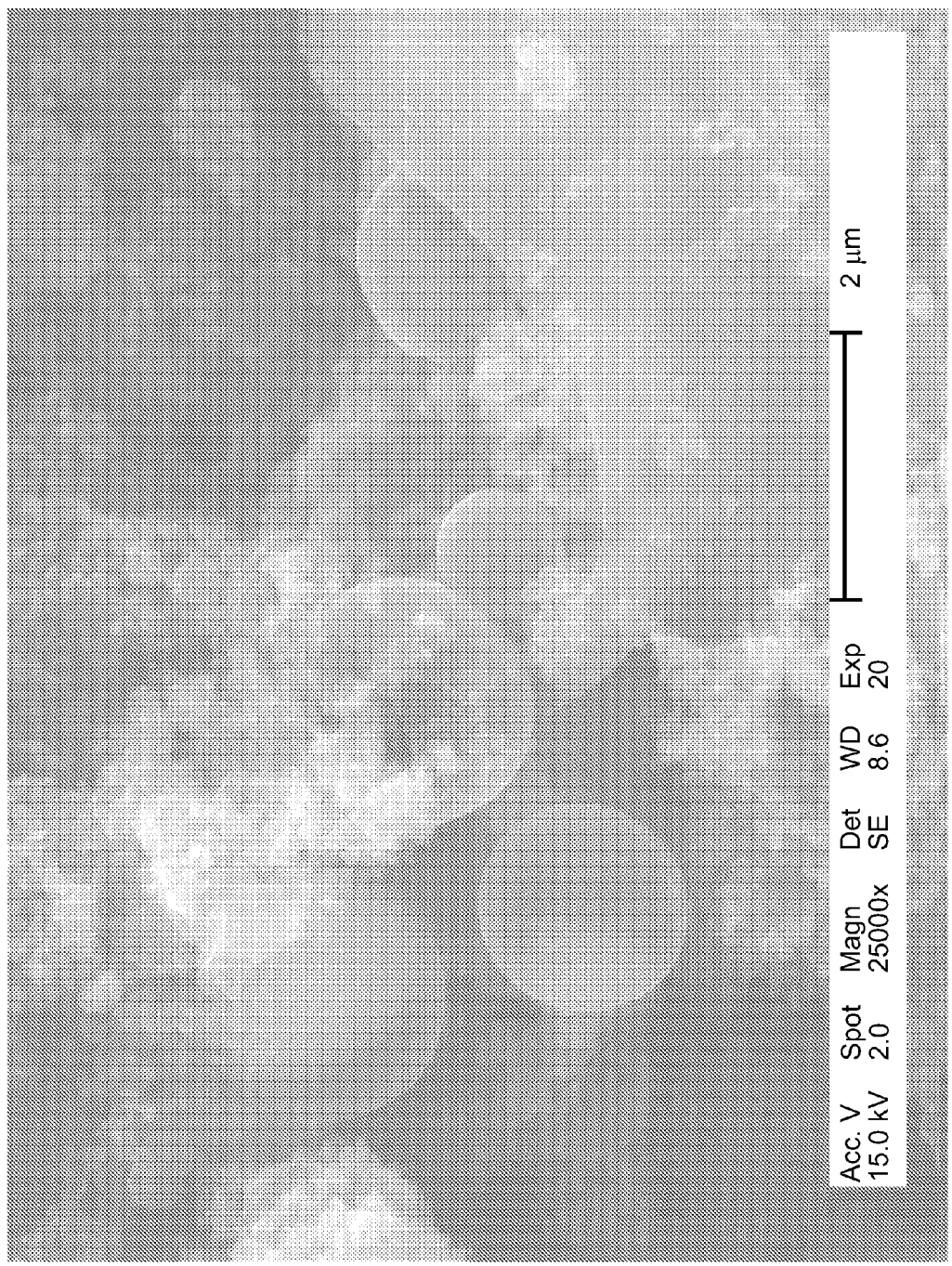
FIG. 3. is a SEM image of the powdery product obtained from tire rubber treated according to Example 6.
Figure 4:
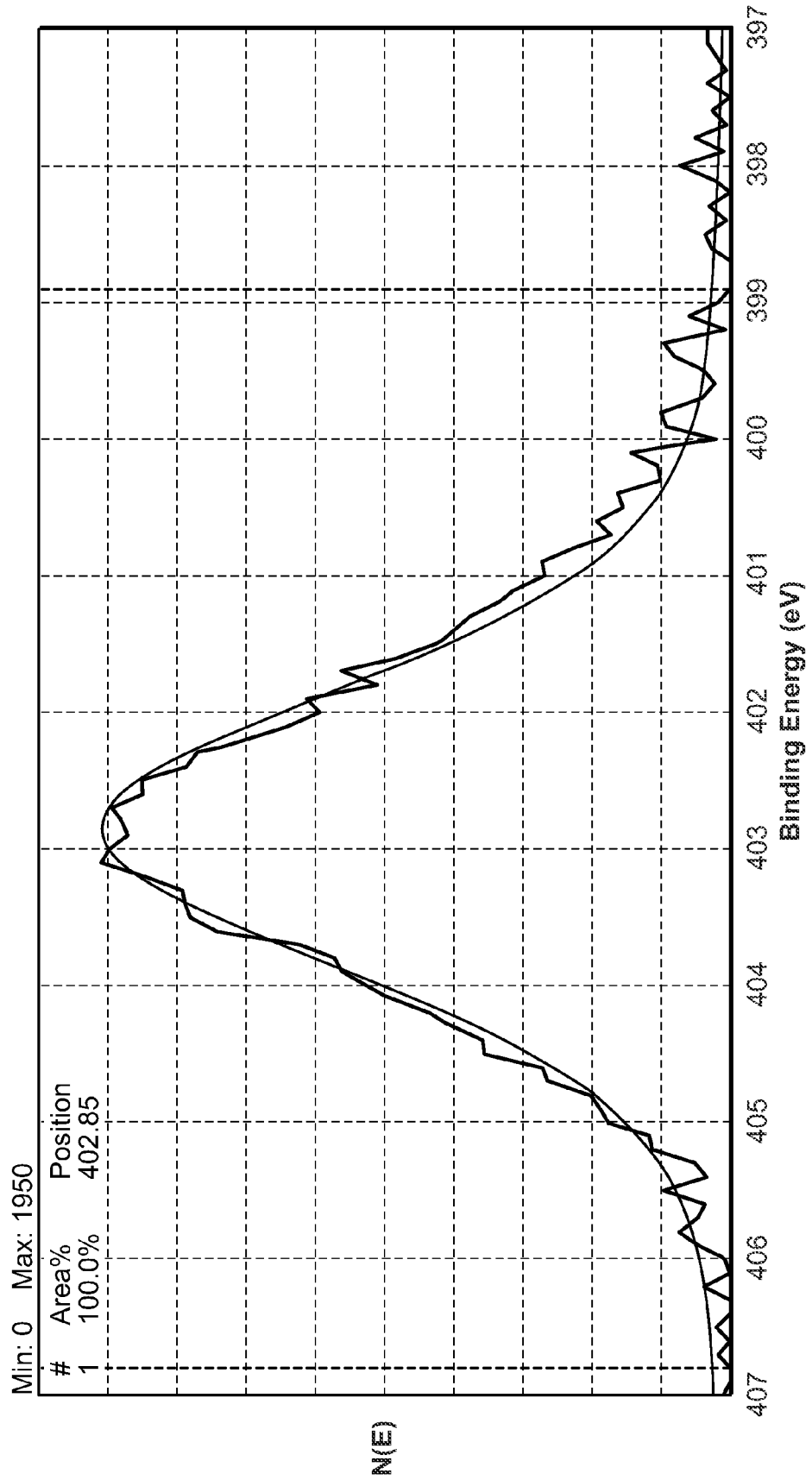
FIG. 4. is an XPS spectrum image of the nitrogen-doped material (a powdery product) obtained according to Example 8.

3) Upon higher temperatures, at or slightly exceeding 150° C. (300° F.), the major product of scrap tire processing is better described as a fine black powder. Using elemental analysis, FTIR (Fourier Transform Infrared Spectroscopy), XPS (X-ray Photoelectron Spectroscopy) and SEM (Scanning Electron Microscopy) the black powder has been determined to be a mixture of carbon black (a rubber component), nitrogen-doped carbonaceous material, and $NH_4Cl$. $NH_4Cl$ can be easily separated by washing with water and used accordingly. The mixture of carbon black and nitrogen-doped carbonaceous material appears as a rather uniform fine powder, and only using a strong magnification one can distinguish the two components, as it is shown in FIG. 3. If the process is run with the chemical reagent and no rubber or another polymer loading, a uniform nitrogen-doped carbonaceous material is produced, which has the following composition: 79.6% by weight of carbon, 18.9% by weight of nitrogen, and 1.4% by weight of hydrogen. An XPS spectrum of this carbonaceous material for N1s is shown in FIG. 4. A single broaden peak at 402.8 eV seen in FIG. 4 suggests that nitrogen is present mostly in the quaternary form or condensed heterocyclic forms, according to what was reported in Energy & Fuels, 1998, vol. 12, pp. 672-681. The nitrogen-doped carbonaceous material produced in this way have characteristics similar to those described in the U.S. Pat. No. 8,034,976 by Hinago and Nagahara, but the present invention advantageously uses in situ formed HCN, not free hydrogen cyanide. The water-washed black powdery material can be used, for example, as a moderately hydrophilic (due to the nitrogen doping) pigment for cement or a colorant (tinting agent) for UV-sensitive polymers. Another possible application of such black powder is in agriculture. The U.S. Pat. No. 4,252,919 patent describes how distantly similar materials can be used as fertilizers and soil-improving agents. A further possible application of the carbonaceous powdery product can be found in the manufacturing of electrodes for lithium ion batteries or capacitors as well as adsorbents for hydrogen storage. Yet further possible application of the said material is relevant to metallurgy, specifically to means of the introduction of nitrogen into cast iron, in the spirit of, for example, the U.S. Pat. No. 4,970,051. One more possible application of the said material is in the reclamation of tailing ponds as an adsorbent and a source of nutrients for further bio remediation.

3a). The said material can be further modified, or activated by heating in an oxygen-free atmosphere at temperatures ranging from 350° C. to 1500° C., with more preferable temperatures from 400° C. to 900° C. The activation process can occur either with venting the nascent gases (mostly $NH_3$ and HCl) out of the reactor or in a sealed reactor with no venting. If the gases are vented the product is a high quality activated carbon, which can be used as a filtration material for the filtration of ballast waters in transoceanic ships (the problem of invasive organisms) or filtration of process waters produced in oil sand in situ operations. If the heat treatment occurs in a sealed reactor, the product is a high quality activated carbon impregnated with $NH_4Cl$ (a nutrient for microbial cultures), which makes it a suitable substrate for microbial colonization. This nutrient-impregnated activated carbon can be used in bioremediation of oil spills, oilfield production waters, and other sorts of polluted water.

4) Upon higher temperatures, at or slightly exceeding 150° C. (300° F.), the major product of wood biomass processing can be described as somewhat brittle wood with a distinct black hue. This material can be crashed or chipped or otherwise comminuted to produce precursors for carbon nanomaterials or sorption coals, similarly to what was suggested in the US patent application 2011/0112246 A1 with regard to a different process.

EXAMPLES

As depicted in the Examples below, in certain exemplary embodiments, compounds are prepared according to the following general procedures. It will be appreciated that, although the general methods depict the synthesis of certain compounds of the present invention, the following general methods, and other methods known to one of ordinary skill in the art, can be applied to all compounds and subclasses and species of each of these compounds, as described herein.

Example 1

Automotive tire rubber was obtained from a local scrap tire processor in the form of either whole tires or ground rubber crumb of the size ranging from 10 mesh to 20 mesh. In instances, the whole tire was cut in small square pieces, approximately ½ inch in size. Wood biomass was sampled as fresh cuts of local pine. Anhydrous ammonia was discharged from a cylinder and liquefied in a dry ice/acetone chilling bath. Dichloromethane (99.5%) was used as received. Liquid ammonia and dichloromethane were mixed in the 1:1 molar ratio, which was approximately a 1:1.4 vol/vol ratio. Until otherwise stated, the pressure reaction vessel used was a 3 mL mini-reactor consisting of a cap and a plug.

Example 2

1.0 g of tire rubber either as a single piece or as rubber crumb and 2 mL of the chemical reagent prepared as indicated in Example 1 were charged into a reaction vessel, which was sealed and kept for 6 hours at room temperature to allow the chemical reagent to penetrate into the rubber matrix. Then the reaction vessel was heated to 120° C. (250° F.), kept at the said temperature for 6 hours, and subsequently cooled to room temperature. At the end of the experiment, it was found that the rubber particles increased their volume by approximately two times being filled with a white microcrystalline material, which was identified with elemental analysis and NMR as a mixture of ammonium chloride and hexamethylenetetramine. After treatment, the rubber particles completely lost their resilience; they were soft and could be torn apart by hand.

Example 3

A similar tire rubber sample treated exactly as indicated in Example 2 was weighed, placed into 100 mL of deionized water and vigorously stirred for 24 hours to remove water-soluble matter. After drying it was found that the rubber sample lost 115 wt % of its original weight. Then the dried sample was placed in deionized water and left in water for 21 days, after which it was weighed again. It was found that due to the water absorption, the sample increased its dry weight by 342 wt %. Then the wet sample was removed from water and left in the air at room temperature. On the tenth day of drying it was weighed and demonstrated an almost complete loss of the absorbed water. This example illustrates the ability of the treated rubber material to slowly release fertilizer as well as to absorb and retain significant amounts of water, multiply exceeding its own weight.

Example 4

A 10 g single piece of waste tire rubber was placed into a 1.2 L stainless steel pressure reactor and 100 mL of the chemical reagent as indicated in Example 1 were charged into the reactor, which was sealed and kept for 6 hours at room temperature to allow the chemical reagent to penetrate into the rubber matrix. Then the reactor was heated to 100° C. (232° F.), kept at the said temperature for 24 hours, and subsequently cooled to room temperature. The maximum recorded pressure was 300 psi at the temperature of 94° C. The resultant material was identical to that obtained according to Example 2.

Example 5

A 1.0 g single piece of freshly cut pine wood and 2 mL of the chemical reagent were charged into a reaction vessel, which was sealed and kept for 6 hours at room temperature to allow the chemical reagent prepared according to Example 1 to penetrate into the wood biomass. Then the reaction vessel was heated to 120° C. (250° F.), kept at the said temperature for 6 hours, and subsequently cooled to room temperature. At the end of the experiment, it was found that the wood markedly decreased its resilience and resembled slightly rotten or otherwise degraded wood. It was found to be soft and could be comminuted using a mortar and a pestle.

Example 6

A 1.0 g single piece of tire rubber and 2 mL of the chemical reagent prepared according to Example 1 were charged into a reaction vessel, which was sealed and kept for 6 hours at room temperature to allow the chemical reagent to penetrate into the rubber matrix. Then the reaction vessel was gradually (in 30 minutes) heated to 150° C. (300° F.), kept at the said temperature for 30 minutes, and subsequently cooled to room temperature. At the end of the experiment, it was found that the rubber piece turned into a black fine powdery material. The resultant product was washed with deionized water to remove water-soluble compounds. After separation and removal of water it was found that the water solubles constitute approximately 30% of the original weight of the black powdery material. Elemental analysis showed that the water-soluble part consisted of ammonium chloride. After washing with water, the black powdery material was washed with chloroform to remove organic hydrophobic compounds. After separation and removal of chloroform it was found that approximately 25% of the original weight of the water-washed black powdery material constituted a resinous tacky material, which was identified with elemental analysis and NMR as reconstituted rubber elastomer. The insoluble part of the black powdery material had the following elemental composition: C 82.87%, H 3.35%, N 6.47%, S 0.93%, and O 7.38% (by difference).

Example 7

Control experiment with no rubber but at the same reaction conditions: 2 mL of the chemical reagent prepared according to Example 1 were charged into a reaction vessel, which was sealed and gradually (in 30 minutes) heated to 150° C. (300° F.), kept at the said temperature for 1 hour, and subsequently cooled to room temperature. At the end of the experiment, no black powdery material was found. Instead, the liquid chemical reagent turned into a white microcrystalline material, which was a mixture of hexamine and ammonium chloride.

Example 8

In a separate run similar to Example 7, the black nitrogen-doped carbonaceous material was indeed produced, but only after a more prolonged, 5 hours heating at 150° C. (300° F.). This observation attests to a catalytic action of some tire rubber constituents, most likely carbon black and zinc oxide.

Example 9

A 1.0 g single piece of freshly cut pine wood and 2 mL of the chemical reagent prepared as indicated in Example 1 were charged into a reaction vessel, which was sealed and kept for 6 hours at room temperature to allow the chemical reagent to penetrate into the wood biomass. Then the reaction vessel was gradually (in 30 minutes) heated to 150° C. (300° F.), kept at the said temperature for 1 hour, and subsequently cooled to room temperature. At the end of the experiment, it was found that the wood turned into a rather brittle material with a distinct black hue. This material may be described as one looking like fossilized wood, and it was also found to sustain combustion.

While we have described a number of embodiments of this invention, it is apparent that our basic examples may be altered to provide other embodiments that utilize the compounds and methods of this invention. Therefore, it will be appreciated that the scope of this invention is to be defined by the appended claims rather than by the specific embodiments that have been represented by way of example.

The contents of all references (including literature references, issued patents, published patent applications, and co-pending patent applications) cited throughout this application are hereby expressly incorporated herein in their entireties by reference. Unless otherwise defined, all technical and scientific terms used herein are accorded the meaning commonly known to one with ordinary skill in the art.

What is claimed is:
1. A process for producing a nitrogen-containing product, the process comprising:
 (a) combining rubber and a chemical reagent in a hermetically sealed reaction vessel, wherein the chemical reagent is made by combining a fist agent of ammonia, anhydrous ammonia or a combination thereof, and a second agent of chloroalkane, dichloromethane or combination thereof;
 (b) heating the contents of the said reaction vessel to a temperature of between about 20-250° C.

2. The process of claim 1, wherein the reaction vessel is under external pressure while heating the contents of the said reaction vessel.

3. The process of claim 1, wherein the heating is at a maximum temperature of between about 50-250° C.

4. The process of claim 1, wherein the heating is at a maximum temperature of between about 80-120° C.

5. The process of claim 1, wherein the heating is at a maximum temperature of between about 50-250° C. for between about 1 minute and 24 hours.

6. The process of claim 1, wherein the heating is conducted with the pressure in the reaction vessel ranging from between about 1 bar to 275 bar (from 14.5 to 4,000 psi).

7. The process of claim 1, further comprising allowing the heated reaction vessel to cool to room temperature.

8. The process of claim 1, further comprising allowing the rubber and chemical reagent mixture to remain in the reaction vessel at room temperature for between about 1 to 600 minutes prior to heating.

9. The process of claim 1, wherein said first agent and said second agent are in a mole-to-mole ratio which ranges from about 1:10 to 10:1, respectively.

10. The process of claim 1, wherein step (a) further includes at least one of, switchgrass, corn stover, sugarcane bagasse, straw, algae, seaweed, peat, lignite, coal, leather, tanning waste, wool, other keratin-containing animal products, fabric cuttings, or chitin.

11. The process of claim 1 further comprising making the chemical reagent by combining at least one of ammonia, anhydrous ammonia or a combination thereof, and at least one of a chloroalkane, dichloromethane or combination thereof prior to combining the rubber with the chemical reagent.

12. A process comprising:
  (a) combining rubber and a chemical reagent in a hermetically sealed reaction vessel, wherein the chemical reagent is made by combining a first agent of ammonia, anhydrous ammonia or a combination thereof, and a second agent of chloroalkane, dichloromethane or combination thereof;
  (b) heating the contents of the said reaction vessel to a temperature of between about 20-250° C.

13. The process of claim 12 further comprising producing the chemical reagent by combining said first agent and said second agent prior to combining the rubber with the chemical reagent.

14. A process for producing a nitrogen-containing product produced by the process of:
  (a) making a chemical reagent by combining a first agent of ammonia, anhydrous ammonia or a combination thereof, with a second agent of a chloroalkane, dichloromethane or combination thereof;
  (b) combining artificial and/or natural cross-linked polymeric material and the chemical reagent in a hermetically sealed reaction vessel;
  (c) allowing the polymeric material and chemical reagent mixture to remain in the reaction vessel at room temperature for between about 1 to 600 minutes prior to heating; and
  (d) heating the contents of the said reaction vessel to a temperature of between about 20-250° C.

15. The process of claim 14, wherein the polymeric material is scrap tires, discarded polyurethane items, used PET bottles, scrap PVC items, or printed circuit boards.

16. The process of claim 14, wherein step (a) further includes at least one of, switchgrass, corn stover, sugarcane bagasse, straw, algae, seaweed, peat, lignite, coal, leather, tanning waste, wool, other keratin-containing animal products, fabric cuttings, or chitin.

* * * * *